United States Patent  (10) Patent No.: US 9,929,429 B2
Liu et al.  (45) Date of Patent: Mar. 27, 2018

(54) POLYMER-SULFUR COMPOSITE MATERIALS FOR ELECTRODES IN LI-S ENERGY STORAGE DEVICES

(75) Inventors: Jun Liu, Richland, WA (US); Yuliang Cao, Wuhan (CN); Lifen Xiao, Wuhan (CN); Jie Xiao, Richland, WA (US); Gregory J. Exarhos, Richland, WA (US); Birgit Schwenzer, Richland, WA (US); Zimin Nie, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 13/561,701

(22) Filed: Jul. 30, 2012

(65) Prior Publication Data

US 2013/0040197 A1  Feb. 14, 2013

Related U.S. Application Data

(60) Provisional application No. 61/521,191, filed on Aug. 8, 2011.

(51) Int. Cl.
*B82Y 30/00* (2011.01)
*C08F 34/00* (2006.01)
(Continued)

(52) U.S. Cl.
CPC ........... *H01M 10/052* (2013.01); *C08F 34/00* (2013.01); *H01B 1/12* (2013.01); *H01B 1/127* (2013.01);
(Continued)

(58) Field of Classification Search
CPC ........... B82Y 30/00; C08F 34/00; H01B 1/12; H01B 1/127; H01B 1/128; H01M 10/052;
(Continued)

(56) References Cited

U.S. PATENT DOCUMENTS 5,462,566 A  10/1995  Skotheim
6,072,026 A * 6/2000 Kawase et al. ............... 528/373
(Continued)

FOREIGN PATENT DOCUMENTS

EP  0818839 A2  1/1998
EP  2337126 A1  6/2011
(Continued)

OTHER PUBLICATIONS

Naoi, K. et al, "Electrochemistry of Poly(2,2'-dithiodianaline): A New Class of High Energy Conducting Polymer Interconnected with S-S Bonds", Jun. 1997, Journal of the Electrochemical Society, vol. 144, No. 6, pp. L173-L175.*
(Continued)

*Primary Examiner* — Miriam Stagg
*Assistant Examiner* — Lilia Nedialkova
(74) *Attorney, Agent, or Firm* — Klarquist Sparkman, LLP

(57) ABSTRACT

Composite materials containing sulfurized polymers and sulfur-containing particles can be used in lithium-sulfur energy storage devices as a positive electrode. The composite material exhibits relatively high capacity retention and high charge/discharge cycle stability. In one particular instance, the composite comprises a sulfurized polymer having chains that are cross-linked through sulfur bonds. The polymer provides a matrix in which sulfide and/or polysulfide intermediates formed during electrochemical charge-discharge processes of sulfur can be confined through chemical bonds and not mere physical confinement or sorption.

15 Claims, 17 Drawing Sheets

(51) Int. Cl.
| | |
|---|---|
| *C08G 75/00* | (2006.01) |
| *H01B 1/04* | (2006.01) |
| *H01B 1/12* | (2006.01) |
| *H01M 4/60* | (2006.01) |
| *H01M 10/052* | (2010.01) |
| *H01M 4/36* | (2006.01) |
| *H01M 4/58* | (2010.01) |
| *H01M 4/38* | (2006.01) |
| *H01M 4/62* | (2006.01) |

(52) U.S. Cl.
CPC ............ *H01B 1/128* (2013.01); *H01M 4/364* (2013.01); *H01M 4/5815* (2013.01); *H01M 4/606* (2013.01); *B82Y 30/00* (2013.01); *H01M 4/362* (2013.01); *H01M 4/382* (2013.01); *H01M 4/625* (2013.01)

(58) Field of Classification Search
CPC ...... H01M 4/362; H01M 4/364; H01M 4/382; H01M 4/5815; H01M 4/606; H01M 4/625
See application file for complete search history.

(56) References Cited

U.S. PATENT DOCUMENTS

| | | | |
|---|---|---|---|
| 6,245,458 B1* | 6/2001 | Sotomura | 429/213 |
| 6,302,928 B1* | 10/2001 | Xu et al. | 29/623.1 |
| 6,652,440 B1 | 11/2003 | Kovalev et al. | |
| 7,029,796 B2* | 4/2006 | Choi et al. | 429/232 |
| 2004/0157122 A1 | 8/2004 | Naoi et al. | |
| 2009/0226809 A1* | 9/2009 | Vu et al. | 429/220 |

FOREIGN PATENT DOCUMENTS

| | | |
|---|---|---|
| JP | 2002329495 A | 11/2002 |
| JP | 2005285376 | 10/2005 |

OTHER PUBLICATIONS

Liang X. et al, "A nano-structured and highly ordered polypyrrole-sulfur cathode for lithium-sulfur batteries", Nov. 30, 2010, Journal of Power Sources, vol. 196, pp. 6951-6955.*

Meyer B. "Elemental Sulfur", Jun. 1976, Chemical Reviews, vol. 76, No. 3, pp. 367-388.*

Hwang, K.S., "Fabrication and characteristics of a composite cathode of sulfonated polyaniline and Ramsdellite—MnO2 for a new rechargeable lithium polymer battery," Journal of Power Sources, 1999, vol. 79, pp. 225-230, Elesevier, South Korea.

Tsai, Tsung-Chieh, "Degradation Kinetics of Polyaniline Base and Sulfonated Polyniline," Ind. Eng. Chem. Res., 1994, vol. 33, pp. 2600-2606, American Chemical Society, Oklahoma State University, Oklahoma, USA.

Xiao, Lifen, et al., "A Soft Approach to Encapsulate Sulfur: Polyaniline Nanotubes for Lithium-Sulfur Batteries with Long Cycle Life," Advanced Materials, 2012, vol. 24, pp. 1176-1181, Wiley-VCH, Richland, WA, USA.

Sarkar, Nabin, et al., "Nanoassemblies of sulfonated polyaniline multilayers," Nanotechnology, 2000, vol. 11, pp. 30-36, IOP Publishing, Ltd., Genoa, Italy.

International Search Report/Written Opinion for International Application No. PCT/US2012/048943, International Filing Date Jul. 31, 2012 dated May 30, 2013.

* cited by examiner

POLYMER-SULFUR COMPOSITE MATERIALS FOR ELECTRODES IN LI-S ENERGY STORAGE DEVICES

PRIORITY

This invention claims priority from U.S. Provisional Patent Application No. 61/521,191, entitled Electrodes for Li—S Batteries, filed Aug. 8, 2011. The Provisional Application is incorporated herein by reference.

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

BACKGROUND

Elemental sulfur is an attractive cathode material for lithium batteries because of its high theoretical capacity (1672 mAh/g) and specific energy (2600 Wh/kg), assuming complete reaction of lithium with sulfur to form $Li_2S$. It also has the advantage of relatively low cost and environmental impact as an electrode material. Practical realization of an acceptable Li—S battery is a challenge for at least two reasons. Elemental sulfur, and its discharge products, has a highly electrically insulating nature ($5 \times 10^{-30}$ S cm$^{-1}$ at 25° C.), which can lower both electrochemical activity and the utilization ratio of sulfur. Another issue commonly associated with the Li—S system is poor cyclability caused by the high solubility of the intermediate lithium polysulfide, $Li_2S_x$ ($2 \leq x \leq 8$), formed during both charge and discharge processes. Dissolved polysulfides can diffuse to the lithium anode where they are then subsequently reduced to short chain polysulfides. Those soluble species can also transport back to the cathode and be reoxidized into long chain polysulfides. The above parasitic process creates an internal shuttle reaction, which results in low coulombic efficiency. Moreover, a fraction of the soluble polysulfides are strongly reduced into insoluble $Li_2S_2$ and/or $Li_2S$, which are then deposited on the anode surface and gradually form a thick layer upon repeated cycling. The same phenomenon also occurs on the cathode surface during discharge. The deactivated insoluble agglomerates on both electrodes can lead to a progressive loss of active materials, inaccessibility of the active components in the interior sulfur electrode, a serious morphology change of the electrode, and increased cell impedance. These cumulative effects can then be reflected in a rapid capacity degradation of the Li—S battery upon charge/discharge cycling.

In order to address the aforementioned challenges, a matrix can be designed to not only support good conductivity and dispersion of sulfur, but also, to constrain sulfur and the polysulfides within a framework. However, simple physical confinement and/or sorption does not appear to be sufficiently effective in retarding polysulfide dissolution so as to improve cycle life. Accordingly, a need exists for an improved composite material exhibiting high capacity retention and high charge/discharge cycle stability when utilized as an electrode in Li—S energy storage devices.

SUMMARY

This document describes lithium-sulfur energy storage devices having a positive electrode comprising a composite exhibiting relatively high capacity and cycle stability compared to the state of the art. The composite can be electrically conductive. Also described are methods for making the composites. The composite comprises a sulfurized polymer having chains that are cross-linked through sulfur bonds. The polymer provides a matrix in which sulfide and/or polysulfide particles can be confined through chemical bonds and not mere physical confinement or sorption.

In some instances and/or stages of operation, the positive electrode can further comprise sulfur particles distributed among the chains. For example, prior to the first discharge of an energy storage device, the positive electrode can comprise all, or at least some, sulfur particles distributed among the polymer chains. Furthermore, even after discharge, at least some sulfur particles can be distributed among the polymer chains along with the sulfide and/or polysulfide particles.

As used herein, a sulfurized polymer can refer to a polymer that includes sulfur on the polymer backbones and/or between polymer chains. In some embodiments, the sulfurized polymer comprises sulfurized polyaniline (SPANI). Alternatively, the polymer can comprise sulfurized polypyrrole or a sulfurized poly(pyrrole-co-aniline). Examples of functional groups, which can be attached to the polymer chains, include, but are not limited to carboxyl, hydroxyl, sulfonate, sulfate, and combinations thereof. In preferred embodiments, at least some functional groups comprise amine and/or imine groups.

In some embodiments, the chemical bonds confining the sulfide and/or polysulfide particles occur between the particles and the functional groups. In certain embodiments, the chemical bonding predominantly excludes weak means of confinement such as physical confinement, physisorption, van der waal bonding, and hydrogen bonding. In still other embodiments, as described in greater detail below, sulfurization (i.e., vulcanization) of the polymer is not so extensive that the sulfur in the composite participates predominantly in cross-linking and strongly covalent bonding to the functional groups. A portion of the sulfur is not bonded to the polymer chains but is confined as sulfur, sulfide, and/or polysulfide particles.

According to one embodiment, the positive electrode has a sulfurized polymer-to-sulfur weight ratio between 2.5 and 0.7 (e.g., the ratio of sulfurized polymer and unconfined sulfur after vulcanization). The sulfurized polymer, in some instances, can have a sulfur content between 25 wt % and 60 wt % (e.g., the weight ratio of elemental sulfur in the form of disulfide bonded in the sulfurized polymer, which can be measured by elemental analysis).

In some embodiments, the positive electrode further comprises a layer comprising a conductive carbon material contacting the composite. Alternatively, or in addition, a conductive carbon material can be distributed throughout the composite. Preferably, the conductive carbon material comprises graphene.

According to some embodiments, lithium-sulfur energy storage devices are configured with the positive cathodes described herein and exhibit a reversible capacity of at least 600 mAh g$^{-1}$ when operated. In other embodiments, the energy storage devices are configured to retain at least 50% of the devices' initial capacity when operated over at least 500 cycles.

In one particular embodiment, a lithium-sulfur energy storage device has a negative electrode comprising lithium and a positive electrode comprising a composite comprising chains of a sulfurized polyaniline (SPANI) polymer cross-linked through sulfur bonds. The composite further comprises nanoparticles comprising sulfide anions, nanoparticles comprising polysulfide anions, or both confined among the chains by chemical bonds between the anions and functional groups attached to the chains. The device is configured to have a reversible capacity of at least 600 mAh $g^{-1}$ when operated.

This document also describes methods of synthesizing the composite for a positive electrode in a lithium-sulfur energy storage device. The methods are characterized by dispersing a polymer in a solution comprising sulfur dissolved in a solvent and then removing the solvent after a time to yield a polymer-sulfur intermediate mixture. The polymer-sulfur intermediate mixture is heated to at least the melting temperature of sulfur for a first amount of time to improve distribution and/or adsorption of the sulfur among the polymer. The polymer-sulfur intermediate mixture is then partially vulcanized at a vulcanizing temperature for a second amount of time sufficient to form cross links between polymer chains through sulfur bonds, thereby yielding a sulfurized polymer. The partial vulcanization also results in sulfide particles, polysulfide particles, or both confined by chemical bonds among the cross-linked chains. Preferably, though not always, the sulfide particles can comprise sulfide anions and the polysulfide particles can comprise polysulfide anions.

In one embodiment, the vulcanizing temperature can be between 200° C. and 350° C. In another embodiment, the weight ratio of the sulfurized polymer to sulfur contained in the particles is between 2.5 and 0.7. In yet another embodiment, the sulfurized polymer has a total content of elemental sulfur between 25 wt % and 60 wt %.

The purpose of the foregoing summary is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The summary is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

Figure 1:
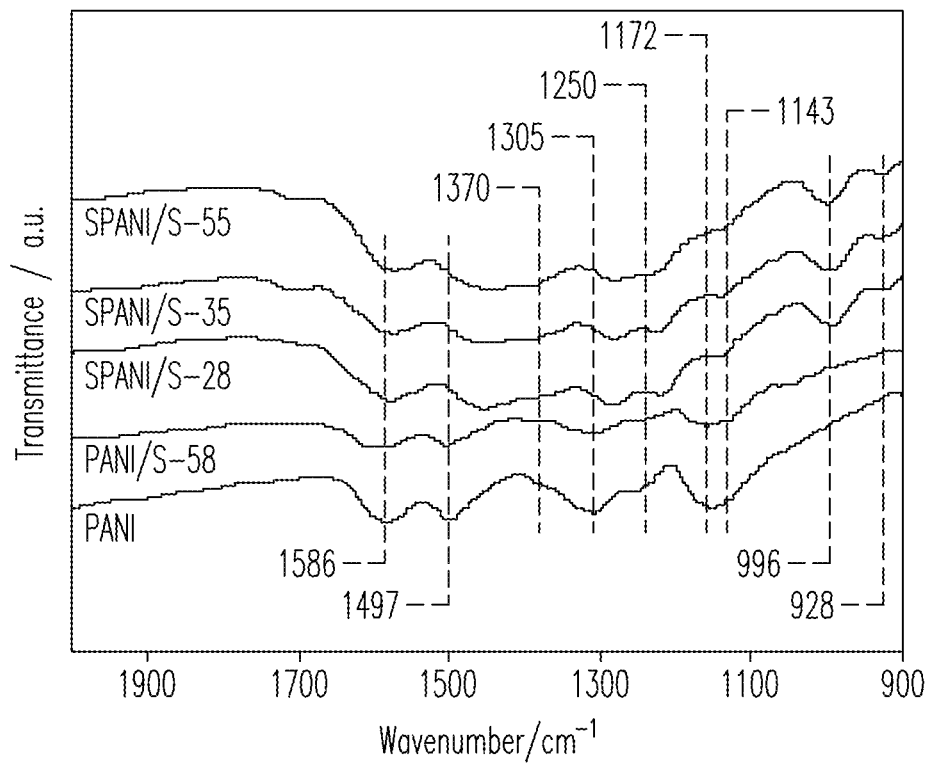
FIG. 1 contains Fourier transform infrared (FTIR) spectra of pure PANI and various SPANI/S composites according to embodiments of the present invention.

It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

The following includes a description of one embodiment of the present invention, in which a flexible interwoven sulfurized polyaniline (SPANI, hereafter) is designed to imbed sulfur in the form of a SPANI/S composite. The soluble long chain polysulfides produced during repeated cycling are effectively constrained within the SPANI spatial network through both physical and chemical interactions. Even after 500 cycles a capacity retention rate of 68% is observed in the S/SPANI composite with a reversible capacity of around 600 mAh $g^{-1}$. According to this embodiment, the framework of the elastic SPANI polymer functions in such a way that the volume of SPANI varies along with the S content, thereby addressing the dislocation issue of sulfur. The embodiment includes amine groups and/or imine groups decorated on SPANI surface, which can further interact or attract soluble polysulfide anions.

Polyaniline (PANI) was first synthesized by a chemical oxidative method. 0.9 mL of aniline was dissolved in 80 mL of 1.5 mol $L^{-1}$ HCl with stirring. A 2.28 g portion of $(NH_4)_2S_2O_8$ was dissolved in 20 mL of deionized water and then quickly added to the above solution. The mixture was stirred constantly at room temperature for 12 h. The PANI solid product was washed with deionized water until the filtrate became colorless and neutral and then dried at 50° C. overnight. SPANI/S composites were synthesized as follows: 0.3, 0.35 and 0.4 g of sulfur were thoroughly dissolved in 2 mL of carbon disulfide ($CS_2$) respectively. Then 0.2, 0.15, and 0.1 g of PANI were added respectively in sequence into the above three solutions and dispersed uniformly under constant stirring. The mixtures were further stirred until the $CS_2$ solvent was completely evaporated. The solid mixtures obtained from this procedure were heated in a sealed vessel filled with argon gas at 155° C. for 12 h and further heated at 280° C. for 12 h to perform the sulfur vulcanization reaction. The products were designated as SPANI/S-28, SPANI/S-35 and SPANI/S-55, respectively, according to the composition and the net elemental sulfur contents based on the thermogravimetric (TG) analysis. For the sake of property comparison, another portion of a mixture composed of 0.3 g of sulfur and 0.2 g of PANI was heated at 155° C. for 12 h; the product obtained was designated as PANI/S-58 according to the TG test. Without the subsequent heat treatment, the PANI/S-58 sample lacked substantial cross-linking of the PANI chains. Furthermore, for comparative purposes, some SPANI/S composites were washed with $CS_2$ to remove any elemental sulfur; the washed products were designated as SPANI. Mesoporous carbon was used for electrochemical impedance spectra.

The various samples were characterized using the following techniques and instruments. Scanning electron microscopy (SEM) experiments were performed on an FEI HELIOS NANOLAB® dual-beam focused ion beam/scanning electron microscope (FIB/SEM). X-ray diffraction (XRD) characterization was carried out on a PHILIPS XPERT® X-ray diffractometer using Cu Kα radiation at λ=1.54 Å at 40 $min^{-1}$ in 10-80° Nitrogen adsorption-desorption isotherms for surface-area and pore analysis were measured using a QUANTACHROME AUTOSORB® Automated Gas Sorption System. Thermal gravimetric analysis was conducted on a METTLER TOLEDO TGA/DSC 1® thermogravimetric analyzer in argon at a scan rate of 10° C./min from room temperature to 800° C. Ramam spectra were excited using 25 mW of 488 nm excitation from a coherent INNOVA 300 C® cw argon ion laser. Backscattered light was analyzed using a SPEX TRIPLEMATE® Spectrometer (Model 1877). Ten scans of 30 s exposure time was signal averaged. XPS measurements were performed with a PHYSICAL ELECTRONICS QUANTERA® Scanning X-ray Microprobe. This system uses a focused monochromatic Al Kα X-ray (1486.7 eV) source for excitation and a spherical section analyzer. The instrument has a 32 element multichannel detection system. A 100 W X-ray beam focused to 100 µm diameter was rastered over a 1.4 mm×0.1 mm rectangle on the sample. The X-ray beam is incident normal to the sample and the photoelectron detector is at 45° off-normal. High energy resolution spectra were collected using a pass-energy of 69.0 eV with a step size of 0.125 eV. For the Ag 3d5/2 line, these conditions produced a FWHM of 0.91 eV. The sample experienced variable degrees of charging. Low energy electrons at ~1 eV, 20 µA and low energy $Ar^+$ ions were used to minimize this charging.

For electrochemical tests, a cathode was prepared by mixing 80 wt % of the active composite, 10 wt % Super P (TIMCAL, graphite & carbon Inc.), and 10 wt % of polyvinylidene difluoride (PVDF, Alfa Aesar) dissolved in N-methyl-2-pyrrolidone (NMP, Aldrich) to form a slurry which was then pasted to an Al foil substrate. Electrochemical tests were performed using 2325 coin cells with lithium metal as the counter electrode. The electrolyte was 1 M lithium bis(trifluoromethane)sulfonamide (LiTFSI) (99.95% trace metals basis, Aldrich) dissolved in a mixture of 1,3-dioxolane (DOL) and dimethyoxyethane (DME) (1:1 by volume). The separator was a CELGARD 3501® microporous membrane. The cells were assembled in an argon-filled glove box. The galvanostatic charge-discharge test was conducted by a BT-2043 ARBIN® Battery Testing System. Cyclic voltammograms and electrochemical impedance spectra were obtained from a SOLARTRON SI 1287® electrochemical interface.

FIG. 1 includes a Fourier transform infrared spectra of pure PANI, PANI/S, and SPANI/S composites obtained in the 900-2000 $cm^{-1}$ wavenumber range. The spectral characteristics of the pure PANI are consistent with expectations for polyaniline. Referring to the spectra in FIG. 1, the two characteristic strong peaks positioned at 1586 and 1497 $cm^{-1}$ correspond to the C=C stretching vibrations of the quinoid (Q) and benzenoid (B) rings in polyaniline, respectively. The bands around 1400-1200 $cm^{-1}$ arise from the C—N stretching vibrational mode of aromatic amines. The two weak absorption peaks centered at 1370 and 1250 $cm^{-1}$ are assigned to the C—N stretching vibration in QBQ and BBB type structures respectively. The strong peak located at 1305 $cm^{-1}$ is associated with the C—N stretching vibration in QBQ, QBB or BBQ type structures. The additional two overlapped strong bands located at 1172 and 1143 $cm^{-1}$ are attributed to the C—H in-plane bending vibration in Q=N=Q and Q=$N^+$H—B (or B—NH—B) units, respectively.

Figure 2A:
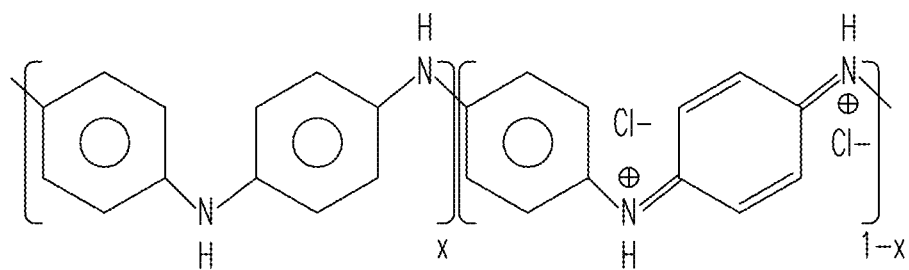
FIGS. 2A-2C include schematic illustrations of PANI, SPANI, and SPANI/S materials according to embodiments of the present invention.
Figure 2B:
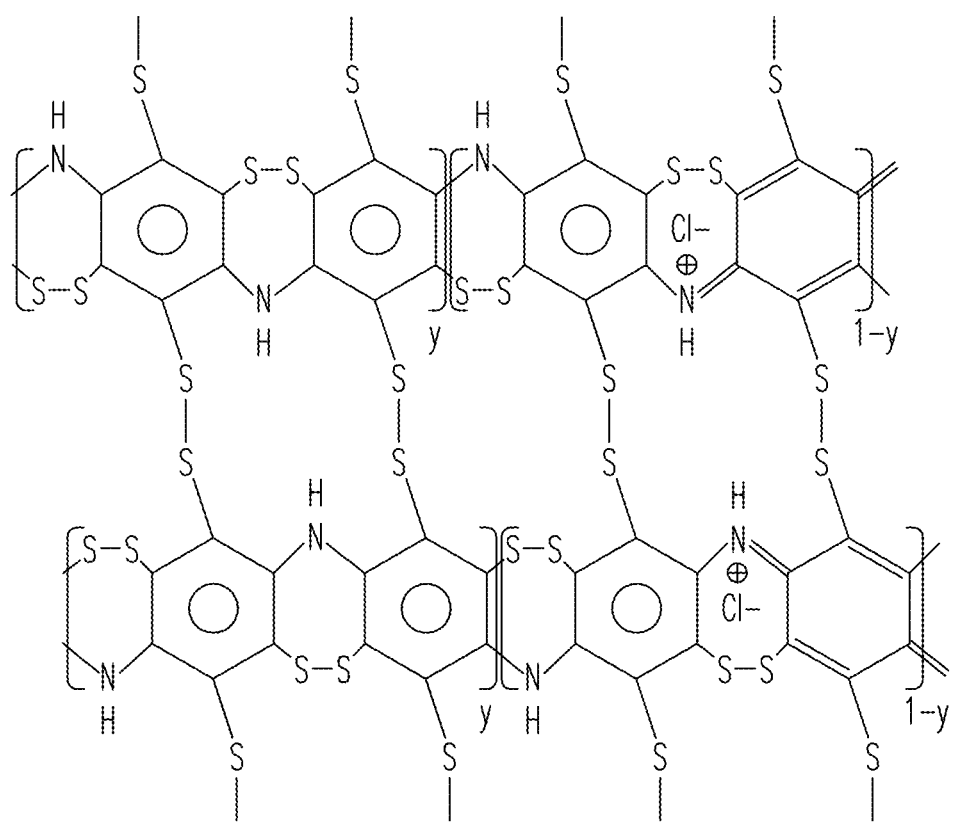

FIGS. 2A and 2B include schematic illustrations of the PANI and the SPANI samples, emphasizing the result of the vulcanization reaction. The relative intensity ratios of the 1586 $cm^{-1}$ and 1497 $cm^{-1}$ peaks and the 1172 $cm^{-1}$ and 1143 $cm^{-1}$ peaks are comparable, indicating that quinoid and benzenoid ring units in the PANI have equivalent concentrations (e.g., x=0.5 in FIG. 2A), indicating PANI exists in an emeraldine salt structure when synthesized under acid conditions. The PANI/S-58 nanocomposite processed at 150° C. displays a similar vibrational spectrum in comparison with that of pure PANI, indicating that no chemical reaction has occurred between sulfur and PANE at 150° C.

However, the spectrum of this composite (i.e., PANI/S-58) upon further heat treatment (e.g., at 280° C.), yields SPANI/S-28, which shows distinct differences. Referring to FIG. 1, the C=C stretching vibrations (1600-1400 $cm^{-1}$) assigned to quinoid and benzenoid rings shift in varying degrees to lower wavenumbers. The shifts are probably caused by the substitution of hydrogen atoms on aromatic rings by the sulfur atoms. Meanwhile, the relative intensity ratio of these two bands increases, which indicates that the number of sulfur substituted benzenoid structural units are more prevalent than those of the sulfur substituted quinoid units. Furthermore, it can also be seen that the C—N stretching vibrational bands (1400-1200 $cm^{-1}$) shift to lower wavenumbers too. The intensity of the C—H vibrational band in the vicinity of 1172 $cm^{-1}$ greatly weakens, further confirming the replacement of hydrogen by sulfur. Two new bands appear in the vicinity of 996 $cm^{-1}$ and 928 $cm^{-1}$. Elemental sulfur shows no vibrational activity in the 900-2000 $cm^{-1}$ range. Therefore, the two new peaks likely originate from vibrations of the aromatic ring (Ar)—S and Ar—S—S—Ar respectively. The other two composites with higher sulfur contents (SPANI/S-35 and SPANI/S-55) that were heat-treated at 280° C. show similar infrared spectral patterns as SPANI/S-28. This is consistent with our conclusion that the substitution reaction has occurred at 280° C.

Other temperatures can be suitable depending on the particular polymer and processing conditions. The substitution reaction resembles that of a "vulcanization reaction" that occurs at high temperature between unsaturated polymer and elemental sulfur. A more structurally stable polymer network subsequently results. In the case of PANI and sulfur, the vulcanization reaction can take place either inter- or intra-molecularly to form disulfide bonds (See FIG. 2B).

Figure 2C:
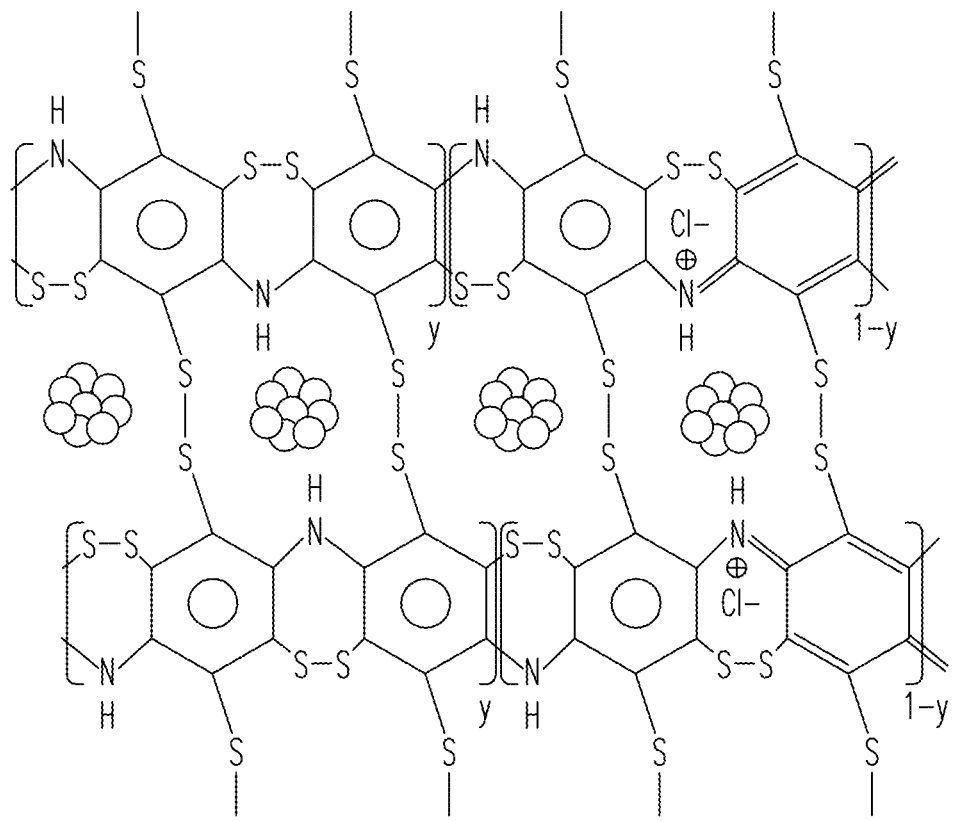
Figure 2C:
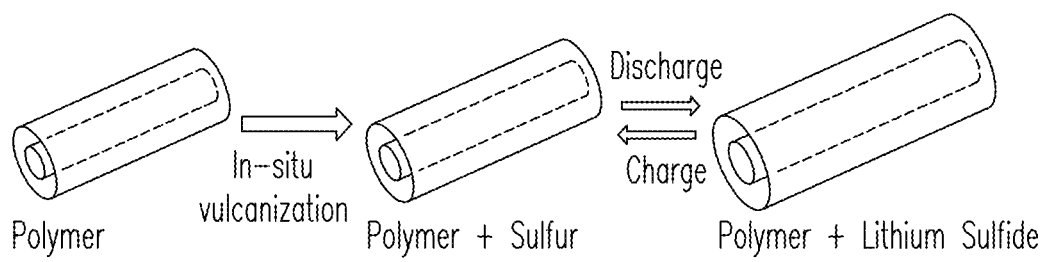

In one embodiment, as illustrated in FIG. 2C, the SPANI/S can comprise nanotubes. The SPANI/S nanotubes can be synthesized by treating the PANI nanotubes with sulfur under heat (e.g., 280° C.). A fraction of the elemental sulfur reacts with the polymer to form a three-dimensional, cross-linked, structurally-stable SPANI nanotube polymer backbone with inter- and/or intra-chain disulfide bonds interconnected through in situ vulcanization. Scanning electron microscopy images of the PANI exhibited nanotube structures. In some embodiments, PANI the nanotubes had a diameter of approximately 150 nm. The diameter can be altered by manipulating the synthesis conditions. For example, by heat treating the composite in the presence of sulfur, the diameter increased to 300 nm. Additional details are described by Xiao et al in Adv. Mater. 2012, 24, 1176-1181, which details are incorporated herein by reference.

Figure 3A:
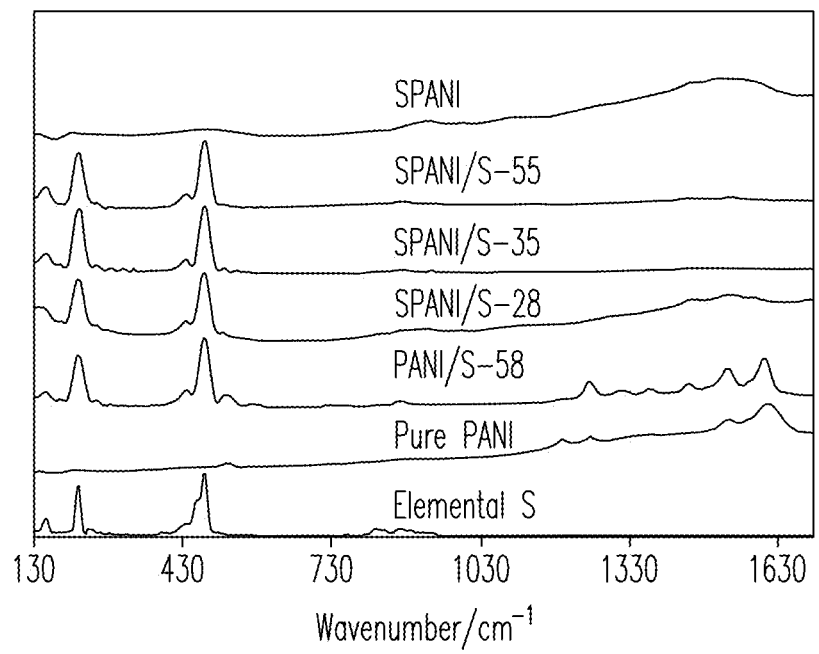
FIGS. 3A and 3B contain Raman spectroscopy spectra for various SPANI/S composites according to embodiments of the present invention.
Figure 3B:
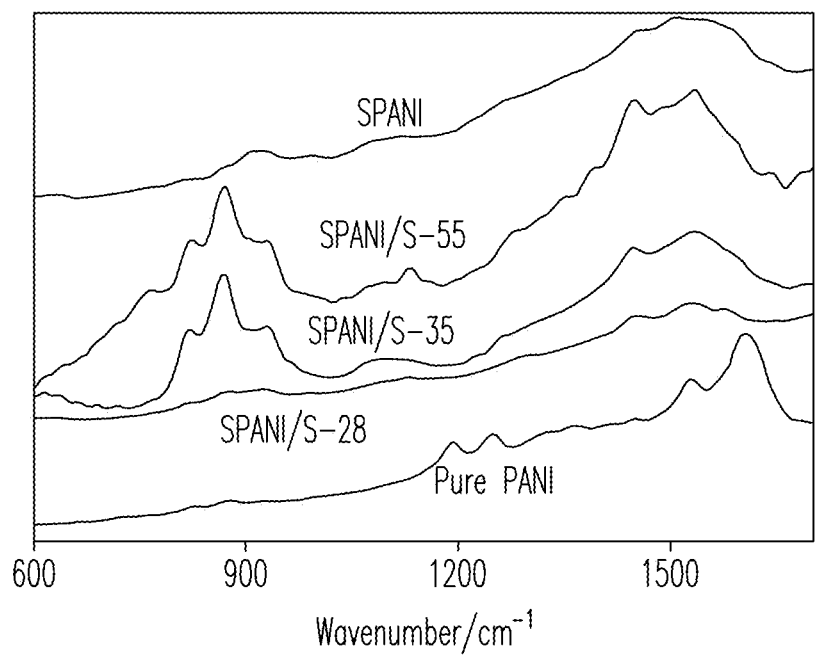
Figure 4A:
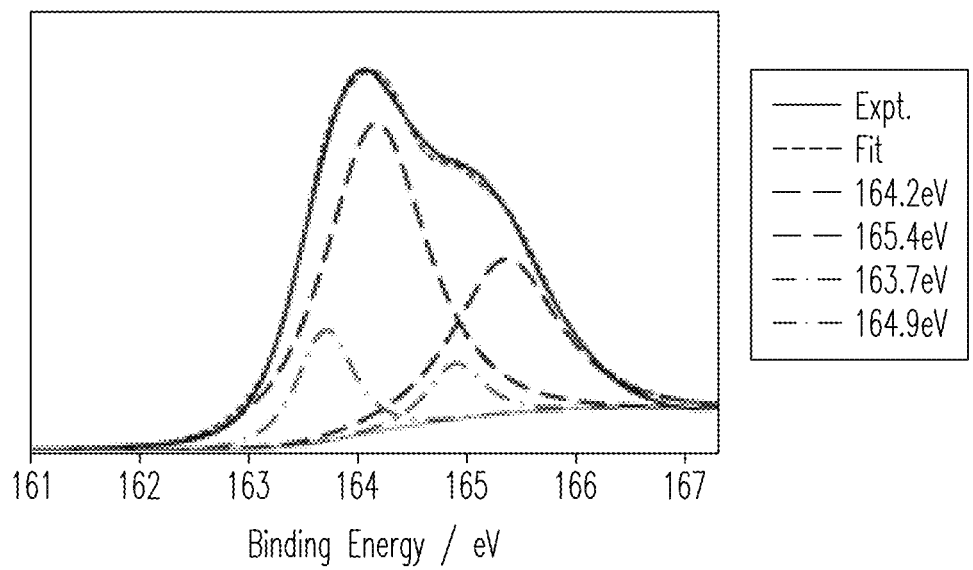
FIGS. 4N-4D contain X-ray photoelectron spectroscopy (XPS) spectra for various SPANI/S composites according to embodiments of the present invention (4A: PANI/S-58, 4B: SPANI/S-28, 4C: SPANI/S-35 and 4D: SPANI/S-55 composite).
Figure 4B:
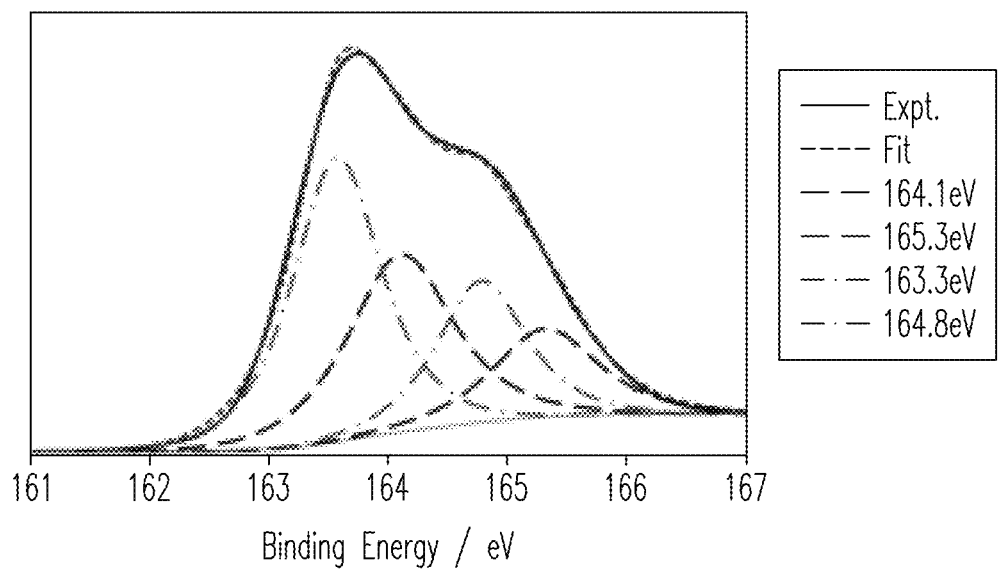
Figure 4C:
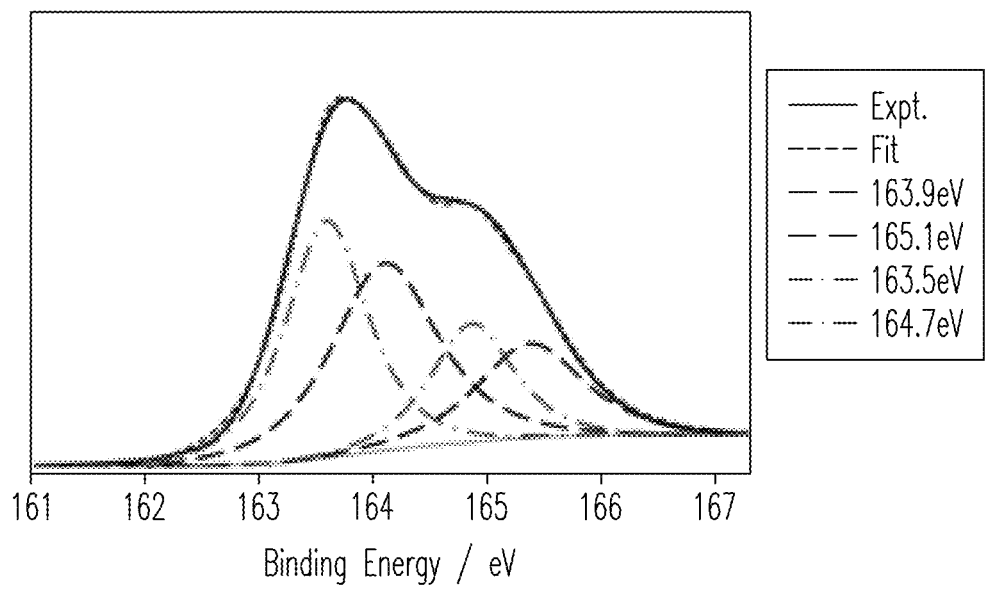
Figure 4D:
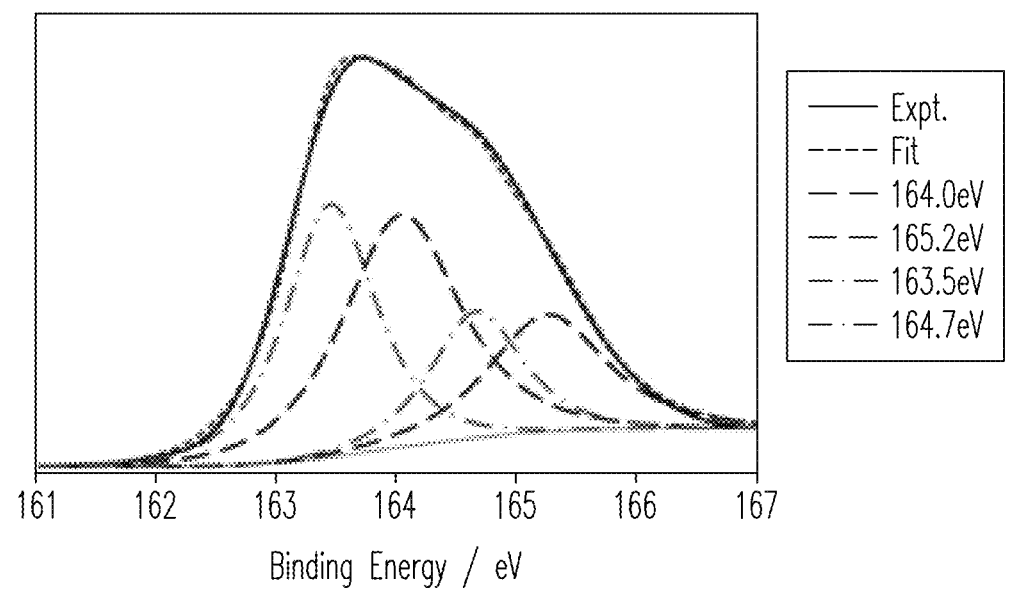

To further confirm the vulcanization reaction, Raman spectroscopy was also performed on the as-prepared composites. As shown in FIG. 3A, several strong peaks in the vicinity of 200-500 cm$^{-1}$ arise from elemental sulfur. The bands seen in FIG. 3B positioned at 1200, 1337/1371 and 1616 cm$^{-1}$ are associated with C—H bending, C—C and C—N vibrational modes of polaron-like or radical cation segments, respectively. The band located at 1260 cm$^{-1}$ corresponds to the C—N stretching mode of benzenoid rings. Bands centered at 1454 and 1536 cm$^{-1}$ originate from C—N and C—C stretching modes of quinoid rings, respectively. For PANI/S-58 synthesized at 155° C., the spectrum shows two sets of peaks belonging to elemental sulfur and PANI indicating no vulcanization reaction occurred at low synthesis temperature in accordance with FTIR measurements.

The SPANI/S composites (SPANI/S-28, SPANI/S-35 and SPAN1/S-55) synthesized at 280° C. present similar Raman spectra. The bands in the low wavenumber range (100-500 cm$^{-1}$) are consistent with elemental sulfur, indicating that elemental sulfur does exist in the composites. However, the bands at medium to high wavenumbers (600-1700 cm$^{-1}$) are obviously different from those seen in pure PANI (FIG. 3A). The main bands of PANI at high wavenumbers (1200-1700 cm$^{-1}$) are still present. But, marked broadening of the peaks in addition to frequency shifts are apparent. This indicates that the chemical environments of C—N and C—C have changed after the vulcanization reaction. For the SPANI/S composites the C—H bending mode of PANI at 1200 cm$^{-1}$ disappears suggesting that H atoms on the aromatic rings have been substituted, in good agreement with the disappearance of the C—H vibrational band in FTIR spectra (FIG. 1). In the middle range of wavenumber (600-1200 cm$^{-1}$), some new peaks that are not observed in pure PANI occur (see FIG. 3B). While the peaks positioned at 937, 1090 and 1138 cm$^{-1}$ can be associated with the stretching vibrations of aromatic rings containing S—S bond, the peaks located at 835 and 873 cm$^{-1}$ are associated with overtone vibrations of sulfur. For comparison, the Raman spectra also were obtained for SPANI samples following removal of sulfur by washing with $CS_2$. The Raman spectra of SPANI shows a similar pattern exhibited by SPANI/S composites in the medium to high wavenumber range (600-1700 cm$^{-1}$) while at low wavenumbers (100-500 cm$^{-1}$), the sharp elemental sulfur peaks are replaced by very weak features, indicating that most of the sulfur was washed out from the SPANI network.

FIG. 4 shows the X ray photoelectron spectra in the S 2p region for the SPANI/S composites (4A: PANI/S-58, 4B: SPANI/S-28, 4C: SPANI/S-35 and 4D: SPANI/S-55 composite). From the FTIR and Raman characterization discussed earlier, sulfur in the composites exists in two different chemical environments. Hence, the S 2p spectra of each composite were fit using two doublets. One doublet is associated with sulfur linked on the aromatic rings of the polymer chains while the other originates from elemental sulfur. Each doublet is comprised of S $2p_{3/2}$ and S $2p_{1/2}$ components. The peak full widths at half maximum (FWHM), the peak energy separation (1.2 eV) and the peak area ratio (2:1) of each doublet are set to be the same during fitting. The fitted data including the binding energies, FWHMs and peak area percentages of the S $2p_{3/2}$ component peaks are listed in Table 1.

TABLE 1

Binding energies (eV) with their corresponding atomic concentrations and peak full widths at half maximum (in parentheses: area % and eV. respectively) of S $2p_{3/2}$ component peaks of different composites. Component 1 is representative of elemental sulfur form while component 2 corresponds to organic disulfides environments.

| Composite | Component 1 | Component 2 |
| --- | --- | --- |
| PANI/S-58 | 164.2 (85, 1.11) | 163.8 (15, 0.60) |
| SPANI/S-28 | 164.1 (42, 1.03) | 163.6 (58, 0.87) |
| SPANI/S-35 | 164.0 (50, 1.03) | 163.5 (50, 0.80) |
| SPANI/S-55 | 164.0 (54, 1.13) | 163.5 (46, 0.88) |

In the case of PANI/S-58, the S $2p_{3/2}$ component peaks of the two doublets are centered at 164.2 eV and 163.8 eV, respectively. The S $2p_{3/2}$ peak positioned at 164.2 eV is up to cyclic octa-atomic elemental sulfur. The S $2p_{3/2}$ peak positioned at lower binding energy (163.8 eV) appears to be associated with sulfur linked on the aromatic rings, since sulfur in this chemical environment should have a higher electron density than in its neutral form due to the electron-donating character of the phenyl rings. Therefore, the binding energy will decrease accordingly. This data is also in agreement with that seen for poly(Phenylene Sulfide) (163.8 eV) and poly (benzenethiol) (163.6 eV). As can be seen in Table 2, 85% of sulfur is present in a neutral form in PANI/S-58, implying that only a small portion of the sulfur has chemically interacted with polyaniline at 155° C. It has to be noted that the corresponding area cannot be used for quantitative analysis, as a portion of elemental sulfur will sublime in the ultra high vacuum system during XPS analysis. However, the data can still be used qualitatively to understand the relative composition of sulfur in the two chemical environments.

TABLE 2

Results of elemental compositions, S/C atomic ratios on SPANI backbone. BET and TG data of different composites.

| | BET/ $m^2 g^{-1}$ | Elemental analysis/wt. % | | | | TG/% | S/C |
| --- | --- | --- | --- | --- | --- | --- | --- |
| | | S | C | N | H | | |
| PANI/S-58 | 4.80 | | | | | ~58 | |
| SPANI/S-28 | 8.00 | 61.1 | 29.1 | 5.03 | 1.08 | ~28 | 0.43 |

TABLE 2-continued

Results of elemental compositions, S/C atomic ratios on
SPANI backbone, BET and TG data of different composites.

| | BET/ m² g⁻¹ | Elemental analysis/wt. % | | | | TG/% | S/C |
| --- | --- | --- | --- | --- | --- | --- | --- |
| | | S | C | N | H | | |
| SPANI/S-35 | 4.67 | 73.1 | 22.2 | 3.74 | 0.73 | ~35 | 0.63 |
| SPANI/S-55 | 1.08 | 83.3 | 14.3 | 3.60 | 0.50 | ~55 | 0.72 |

* BET of neat PANI is 32.0 m² g⁻¹.

Compared with PANI/S-58, The S $2p_{3/2}$ peaks of SPANI/S composites corresponding to sulfur connected with aromatic rings shift about 0.2-0.3 eV towards lower binding energy, indicating that the interactions between sulfur and aromatic rings get strengthened after the vulcanization reaction. At the same time, the S $2p_{3/2}$ peaks corresponding to elemental sulfur shift about 0.1-0.2 eV towards lower binding energy, implying that its chemical environment is slightly changed as well. In addition, as can be seen from Table 2, the S $2p_{3/2}$ peak areas of the SPANI/S corresponding to elemental sulfur increase with the sulfur contents of the composites, confirming reasonableness of the fits.

Figure 5:
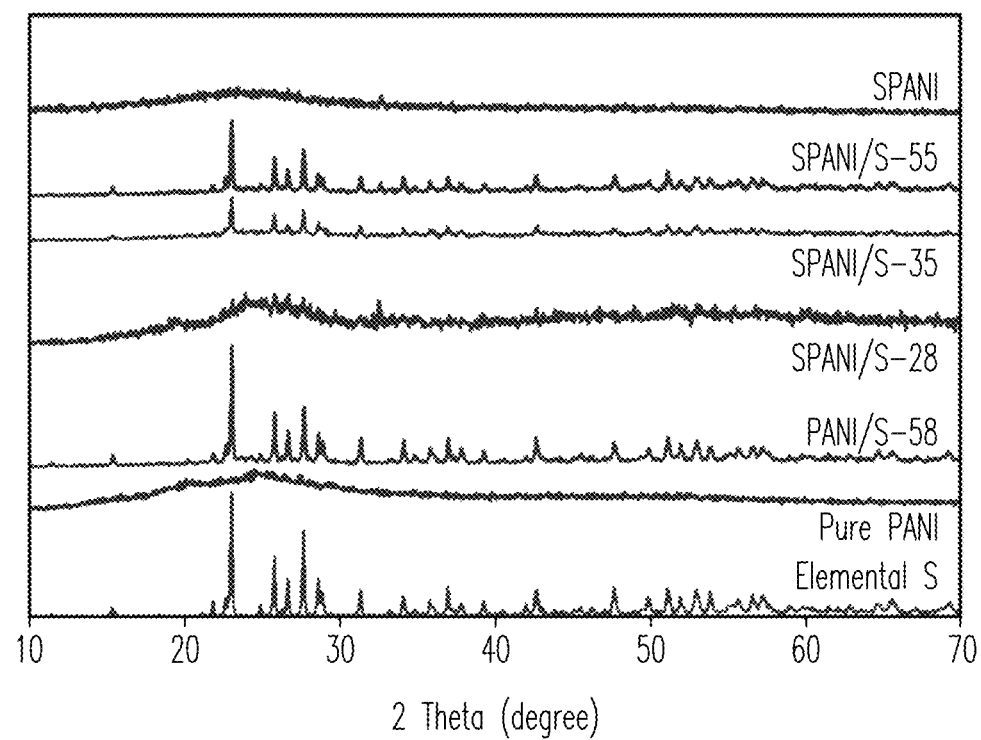
FIG. 5 contains X-ray diffraction (XRD) patterns for various SPANI/S composites according to embodiments of the present invention.
Figure 6A:
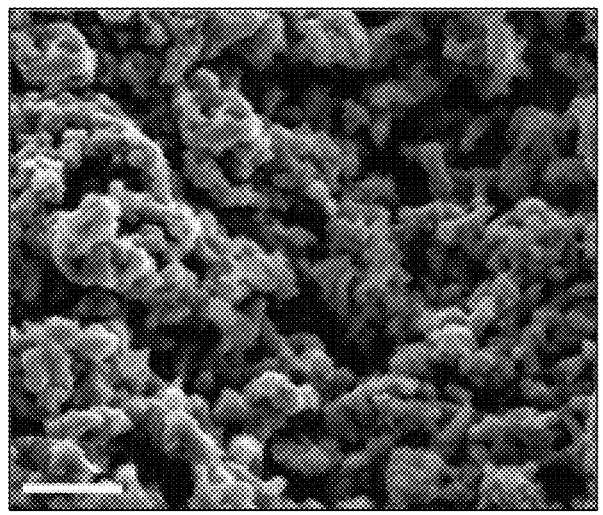
FIGS. 6A-6D contain scanning electron microscope (SEM) micrographs for various SPANI/S composites according to embodiments of the present invention (6A: SPANI, 6B: SPANI/S (28%), 6C: SPANI/S (35%), 6D: SPANI/S (55%)).
Figure 6B:
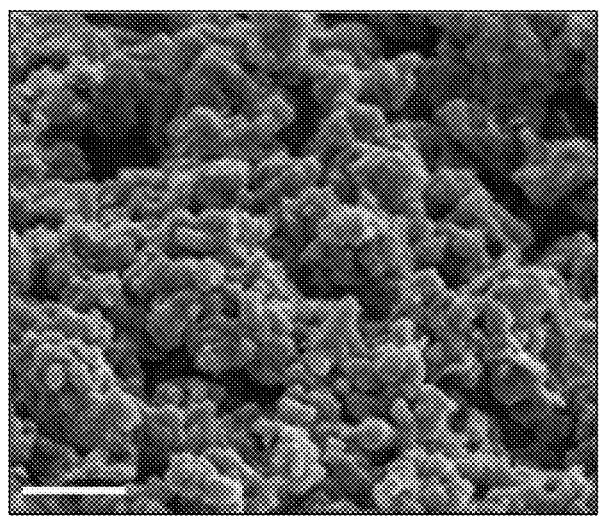
Figure 6C:
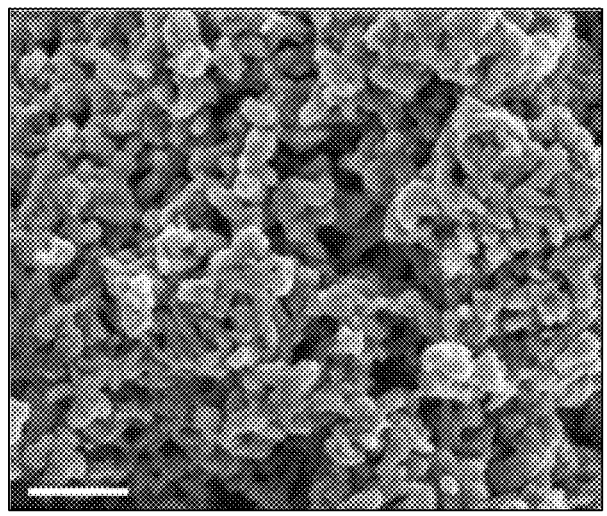
Figure 6D:
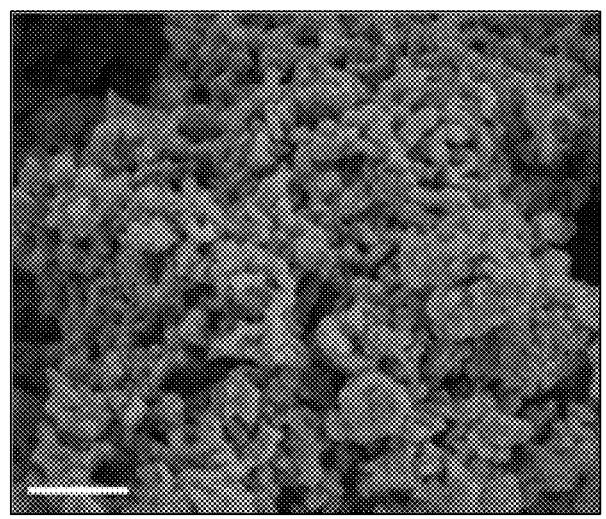

FIG. 5 shows the XRD patterns of PANI/S and SPANI/S composites. The XRD data of elemental sulfur and pure PANI are also displayed for comparison. The XRD pattern of PANI showed an atypical amorphous structure with a broad peak centered at 2θ=26°. Elemental sulfur exhibits some sharp and strong peaks throughout the entire diffraction range indicating good crystallinity (Fddd orthorhombic structure). For PANI/S-58 the diffraction peaks of elemental sulfur are visible but the intensities of the broadened sulfur peaks become lower suggesting that the heat treatment at 155° C. improves the dispersion of sulfur within the polymer structure to some extent. However, crystallization of a portion of the sulfur is still unavoidable. After further heating at 280° C. (SPANI/S-28), all diffraction peaks corresponding to sulfur have disappeared indicating that sulfur either becomes amorphous or is uniformly distributed within the polymer matrix. During the vulcanization reaction, the structure of the polymer is reformed to accommodate the unreacted sulfur, which is then uniformly dispersed within the newly formed SPANI framework. Upon increasing the sulfur content to 35% in the SPANI/S composite, sulfur was observed again in FIG. 5; here, diffraction peaks further increase in SPANI/S-55, indicating partial sulfur incorporation in the polymer network that nucleated to form large particles.

Elemental analysis shown in Table 2 indicates that the sulfur contents in the SPANI/S-28, SPANI/S-35 and SPANI/S-55 composites are 61.1, 73.1 and 83.3 wt %, which are close to the original amounts of 60, 70 and 80 wt % sulfur, respectively. TG data show that the pure elemental sulfur content is 28, 35, and 55 wt %, respectively. Therefore, the S/C molar ratios calculated for SPANI are 0.43, 0.63 and 0.72 for SPANI/S-28, SPANI/S-35 and SPANI/S-55 respectively according to the elemental analysis and TG results. The S/C molar ratios increase with the increased initial sulfur content. When the original sulfur content is 60 wt %, about 3 H atoms on each benzene ring are substituted by sulfur. While the original sulfur content increase to 70 and 80 wt %, all of the 4 H atoms on each benzene ring are substituted. Based on the above FTIR analysis, the quinoid ring units in SPANI are less than that seen in the pure PANI (y>x); concurrently, the vulcanization reaction may occur at any neighboring two benzene rings leading to the formation of both inter- and intra molecular-chain organic S—S bonds. Thus, the possible structural formula of SPANI can be written as shown in scheme 1b. This structure also is in accord with the results from aforementioned FTIR, Raman and XPS spectra.

FIG. 6 shows the images of neat PANI and the SPANI/S composites (6A: PANI, 6B: SPANI/S (28%), 6C: SPANI/S (35%), 6D: SPANI/S (55%)). The as prepared pure PANI showed a short rod-like morphology. The rod diameter is approximately 50 nm. Compared with the neat PANI, the morphology of SPANI/S composites showed no obvious change. However, the nanorods showed a slight dilation with increased sulfur content. This indicates that the original PANI backbone dilates through the vulcanization reaction, so the melted sulfur effectively infiltrates into the interior of the SPANI framework. This also explains why the diffraction peaks of sulfur were comparatively intense for the PANI/S-58 sample while they totally disappeared in SPANI/S-28. BET data as listed in Table 2 also confirms this point. The specific surface area of the polymer reduces from the original 32 to 4.8 m² g⁻¹ in PANI/S-58 while it slightly increases to 8 m² g⁻¹ after further heating at 280° C. (SPANI/S-28). When heated at 155° C., melted sulfur diffuses into the surface micropores of the PANI matrix lowering the surface area of the whole composite. After further heating at 280° C., the vulcanization reaction simultaneously forces sulfur to enter into the interior of the newly formed interwoven SPANI polymer network so as to re-expose unreached micropores again. When the content of sulfur further increases, superfluous sulfur crystallizes and totally blocks the surface micropores as well. That is why the surface area of SPANI/S-55 is reduced to as low as 1.08 m² g⁻¹.

Figure 7A:
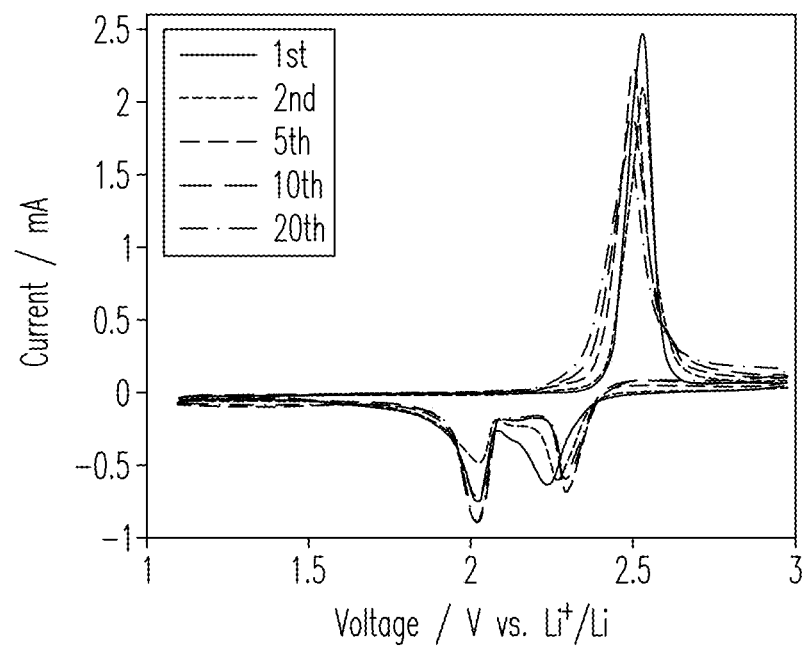
FIGS. 7A-7C contain electrochemical data for various SPANI/S composites according to embodiments of the present invention.

FIG. 7A shows the cyclic voltammograms of the SPANI/S-55 electrode. The plot shows typical characteristics of the elemental sulfur electrochemical reaction. During the cathodic scan, two well-defined reduction peaks positioned around 2.3 and 2.0 V were observed, indicating the two-step reduction of sulfur. The first reduction peak at around 2.3V corresponds to the transformation of cyclooctasulfur ($S_8$) to long chain lithium polysulfide ($Li_2S_n$, 4≤n≤8). The second peak at around 2.0 V is attributed to the decomposition of a polysulfide chain to form insoluble short chain lithium sulfide ($Li_2S_2$ or $Li_2S$). In the subsequent anodic scan, only one intense oxidation peak was found at ~2.5 V because of the polarization. In the following scans, the reduction peak current shows continuous increase up to 20 cycles.

Figure 7B:
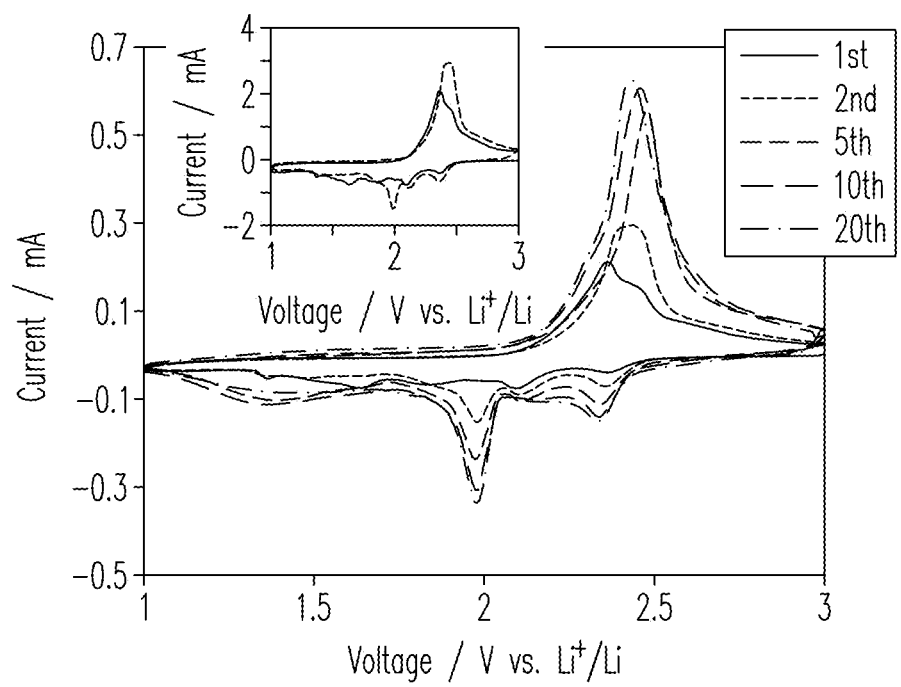

As the backbone of the composite is SPANI, it is necessary to investigate intrinsic electrochemical properties and capacity contribution. In order to get pure SPANI, $CS_2$ was used to dissolve the elementary sulfur out of the polymer. Unfortunately, there is still about 10% sulfur that cannot be completely removed from SPANI which is confirmed by TGA and Raman spectrometry. It is possible that some sulfur is deeply entrained in the SPANI network or has strong interactions with the polymer backbone chains precluding complete removal. The CV curve of the SPANI sample (with residual sulfur) appears in FIG. 7B. During the first cathodic scan, there are two reduction peaks above 2.0 V indicating the existence of residual elemental sulfur. Apart from the two sulfur reduction peaks, two other peaks at 1.5 V and 1.7 V (inset in FIG. 7B) are also found which match well with the electrochemical reduction of organic disulfide bonds (S—S) connected to aromatic rings. The two reduction peaks below 2.0 V also further confirm that the electroactive disulfide bonds are in two different microenvironments. As discussed above and shown in FIG. 2B, the two peaks should correspond to the scission of S—S bonds inter- and intra molecular. During the first anodic scan, two adjacent peaks can be observed at 2.38 V and 2.45 V. The former belongs to the recombination of the organic disulfide bonds while the latter indicates the oxidation of $Li_2S$. In subsequent scans, all of the redox peak currents increase, suggesting that the activation process which is also observed in FIG. 7A should be related to the gradual electrolyte infiltration into the polymer network or a structural reconstruction of the polymer. In comparison, the CV curves of SPANI/S-55 show dominantly redox characteristics from elemental sulfur (FIG. 7A) suggesting that, compared with sulfur, SPANI has much lower electrochemical activity. Therefore the redox peaks from the SPANI polymer were totally hidden in the traces of SPANI/S composite.

Figure 7C:
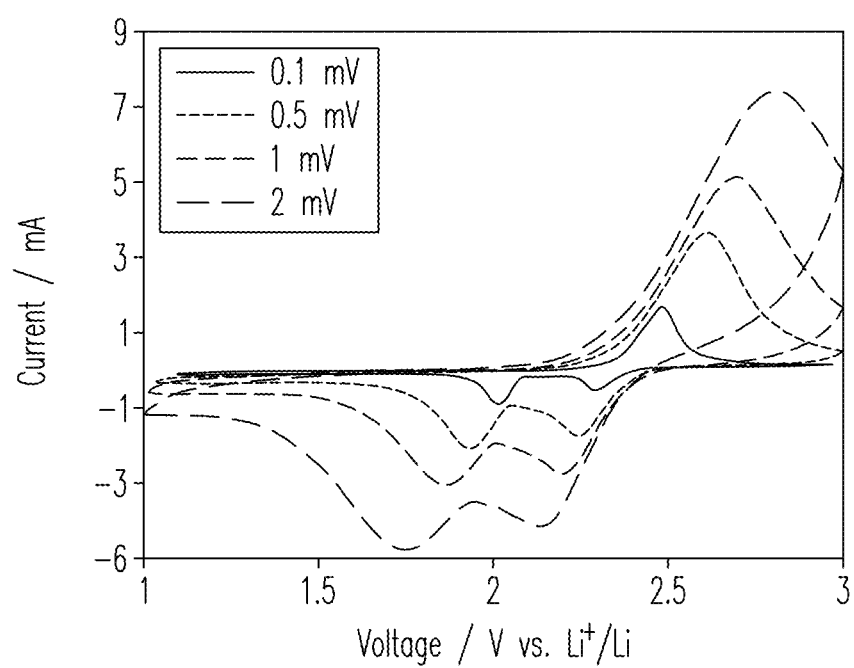

FIG. 7C reveals the CV curves of the SPANI/S-55 electrode at different scan rates. As can be seen, both peak current and polarization potential increase with scan rate. When the scan rate is as high as 2 mV $s^{-1}$, the current peaks still display monotonically continuous peak shapes, indicating that the composite has an increased rate capability. Moreover, all three peak currents are proportional to the square roots of the respective scan rates (inset in FIG. 7C), showing that the rate of the electrochemical reactions in the S-based electrode is controlled by the polysulfides diffusion step in the polymer network.

Figure 8A:
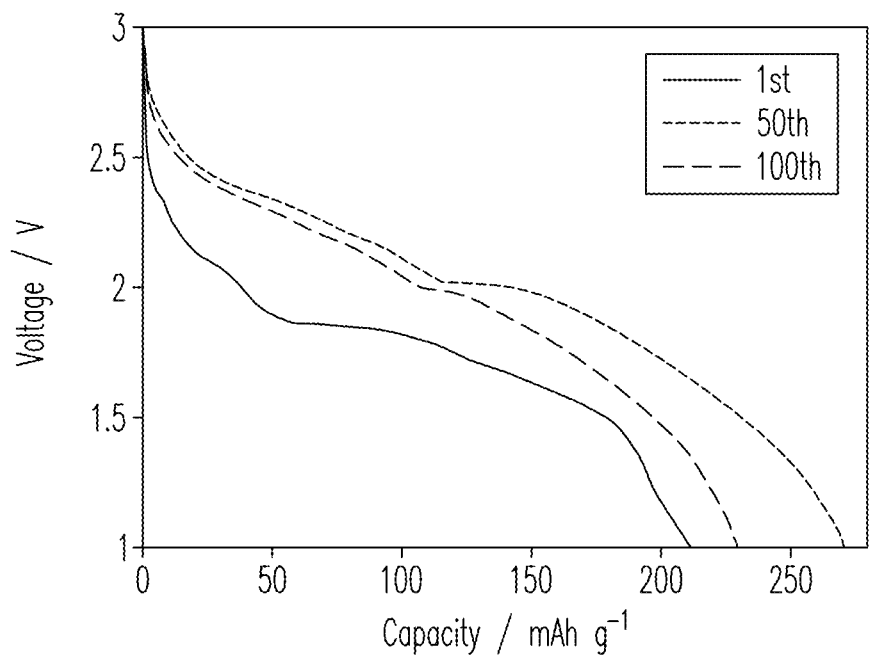
FIGS. 8A and 8B contain discharge capacities and capacities vs. cycle numbers for SPANI.
Figure 8B:
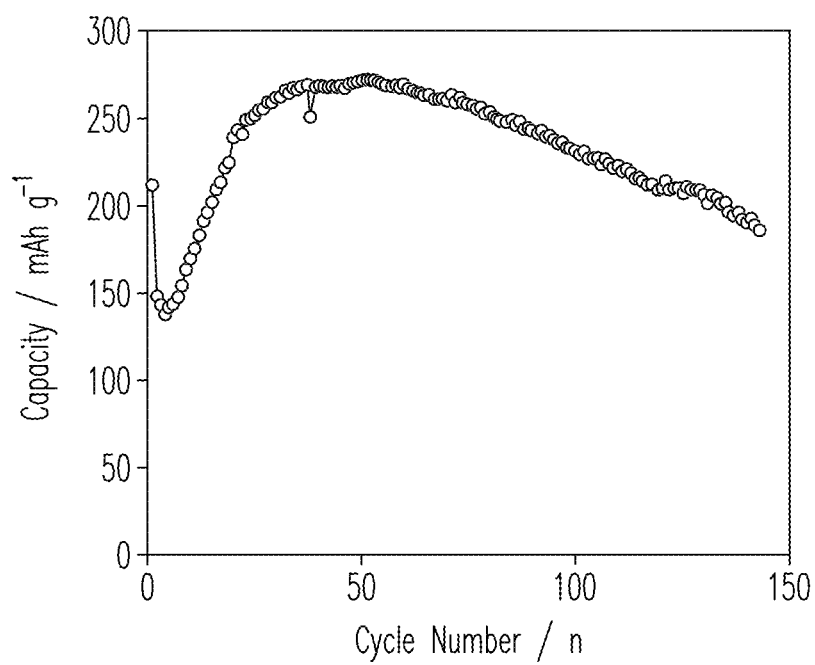

To exclude the capacity contribution from the SPANI polymer itself, the galvanostatic charge/discharge curves of SPANI are shown in FIGS. 8A and 8B. A stable capacity of 230 mAh $g^{-1}$ was obtained from the SPANI backbone. A further calculation of the voltage profile reveals that the capacity delivered from the two plateaus above 2.0 V is 130 mAh $g^{-1}$ which is contributed by the residual sulfur entrained in the polymer. Another 100 mAh $g^{-1}$ capacity from the slope below 2.0 V is attributed to the reversible electrochemical scission and re-bonding of disulfide bonds linked with the main chains of SPANI. Therefore the electrochemical capacity of elemental sulfur in SPANI/S composites can be easily calculated as $Q_S=[Q_{total}-100*(1-C_S)]/C_S$ (where $Q_s$ is the capacity based on elemental sulfur; $Q_{total}$ is the total capacity based on the mass of the electrode material; $C_s$ is the fractional content of elemental sulfur in the composites).

Figure 9A:
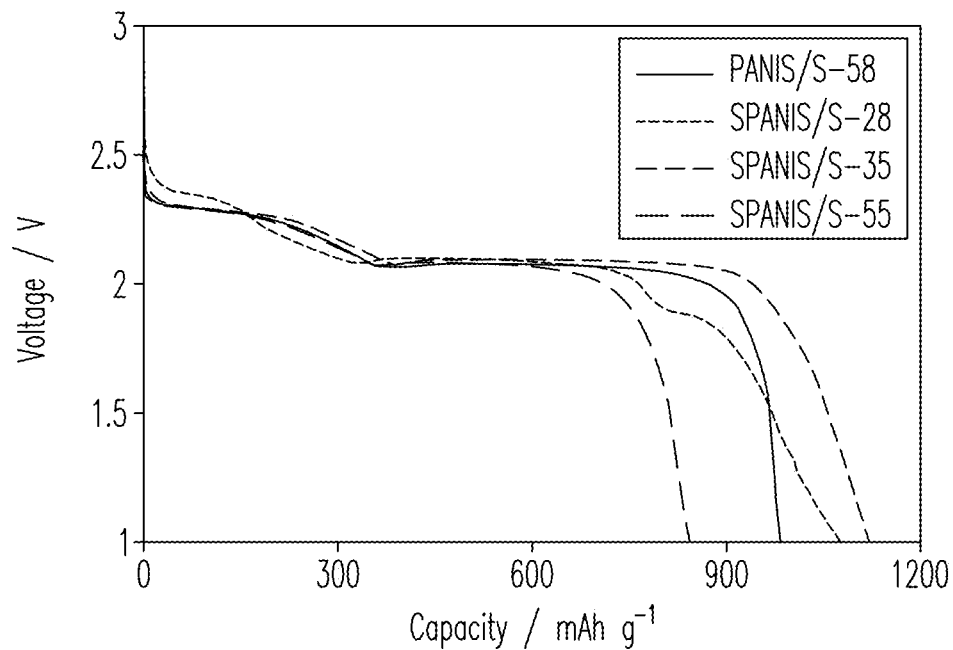
FIGS. 9A and 9B contain discharge capacities and capacities vs. cycle numbers for various SPANI/S composites according to embodiments of the present invention.
Figure 9B:
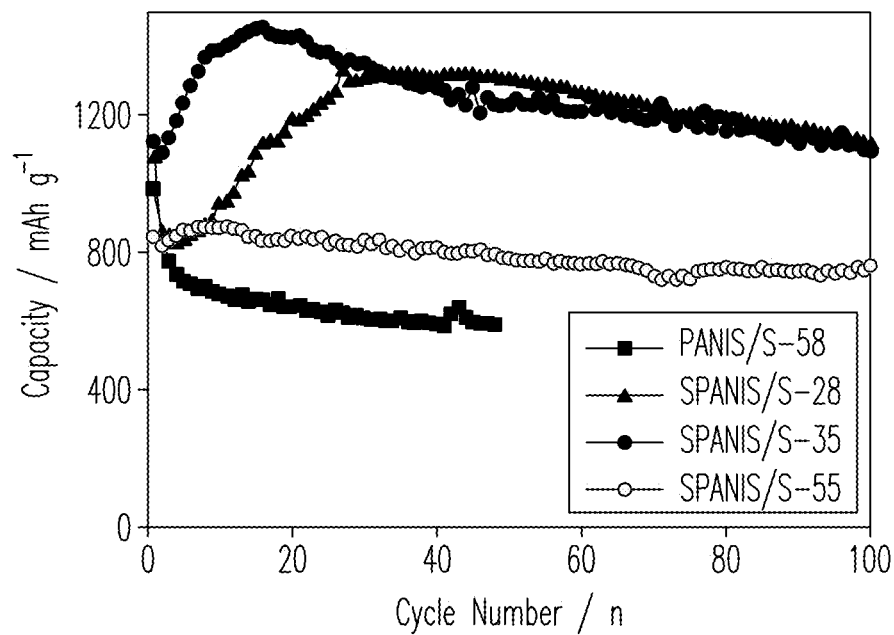

FIGS. 9A and 9B shows the galvanostatic charge/discharge curves of the composite SPANI/S cathodes containing different elemental sulfur contents during the first cycle at 0.1 C (IC=1680 mAh $g^{-1}$ based on elemental sulfur). The first discharge capacity of PANI/S-58 is 982 mAh $g^{-1}$. The first discharge capacities are about 1077, 1121, 845 mAh $g^{-1}$ for SPANI/S-28, SPANI/S-35 and SPANI/S-55, respectively. At the lower sulfur contents of 28% and 35%, the utilization rates of sulfur are comparable since their initial capacities are almost equal and show better initial capacities than PANI/S-58. When the sulfur content increases to 55%, the utilization rate of sulfur decreases due to the partial aggregation of sulfur since the redox reactions of sulfur can only occur on the interface between sulfur and the conductive matrix. From a cycling's perspective (FIG. 9B), PANI/S-58 shows a continuous decline of capacity from the beginning, which is similar to other polymer/S composites. SPANI/S composites show increasing capacities during the initial several tens of cycles which then decrease slowly. This indicates that the SPANI/S electrodes require an activation step as also can be observed from the CV curves of SPANI/S and SPANI in FIG. 7. The possible reason for the activation process is that, as mentioned earlier the surface area of as-prepared SPANI/S composite is very low compared with carbon/S composite therefore it takes a while for the electrolyte to flood the internal surface of the polymer. A portion of deeply buried sulfur and disulfide bonds gradually become electrochemically active only when they come into contact with enough electrolyte.

Figure 10A:
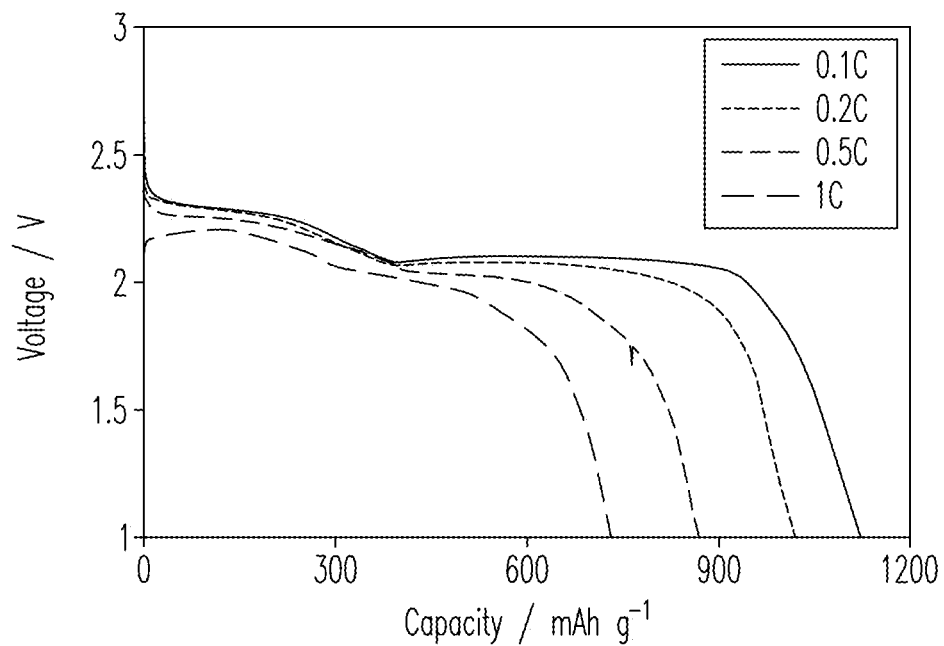
FIGS. 10A-10D contain discharge capacities and capacities vs. cycle numbers for SPANI/S-35 and SPANI/S-55 according to embodiments of the present invention.
Figure 10B:
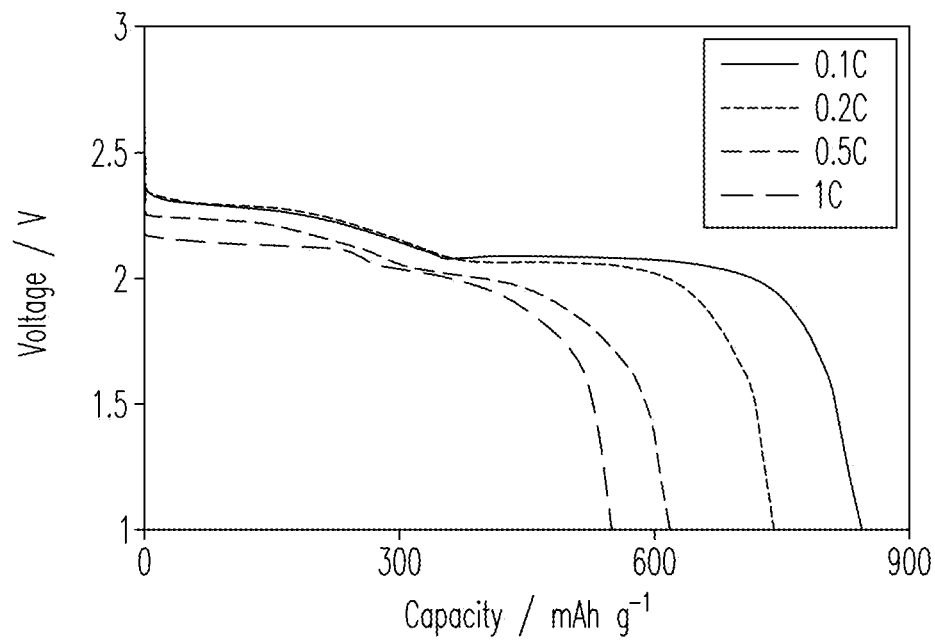

FIGS. 10A and 10B show discharge curves of SPANI/S-35 and SPANI/S-55, respectively, at different capacity rates. In both electrodes, the two typical discharge plateaus are clear at each rate, showing relatively low electrochemical polarization of the SPANI/S composite. For SPANI/S-35, The initial discharge capacities are 1121, 1021, 871, and 733 at 0.1, 0.2, 0.5 and 1 C rates, respectively, indicating that the well dispersed sulfur contains high electrochemical activity and sulfur utilization. For SPANI/S-55, the initial discharge capacities are 845, 741, 614, and 551 at 0.1, 0.2, 0.5 and 1 C rate, respectively. SPANI/S-55 displayed a relatively lower capacity than that of SPANI/S-35 at different current densities.

Figure 10C:
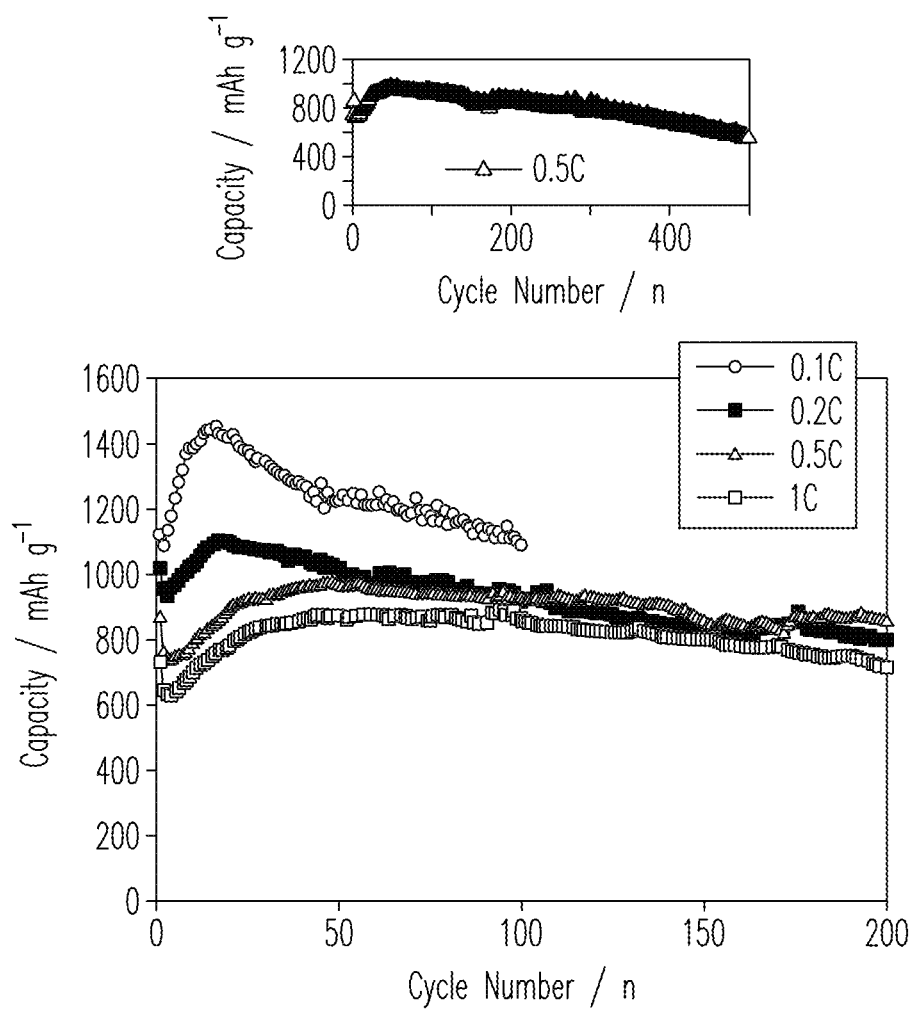
Figure 10D:
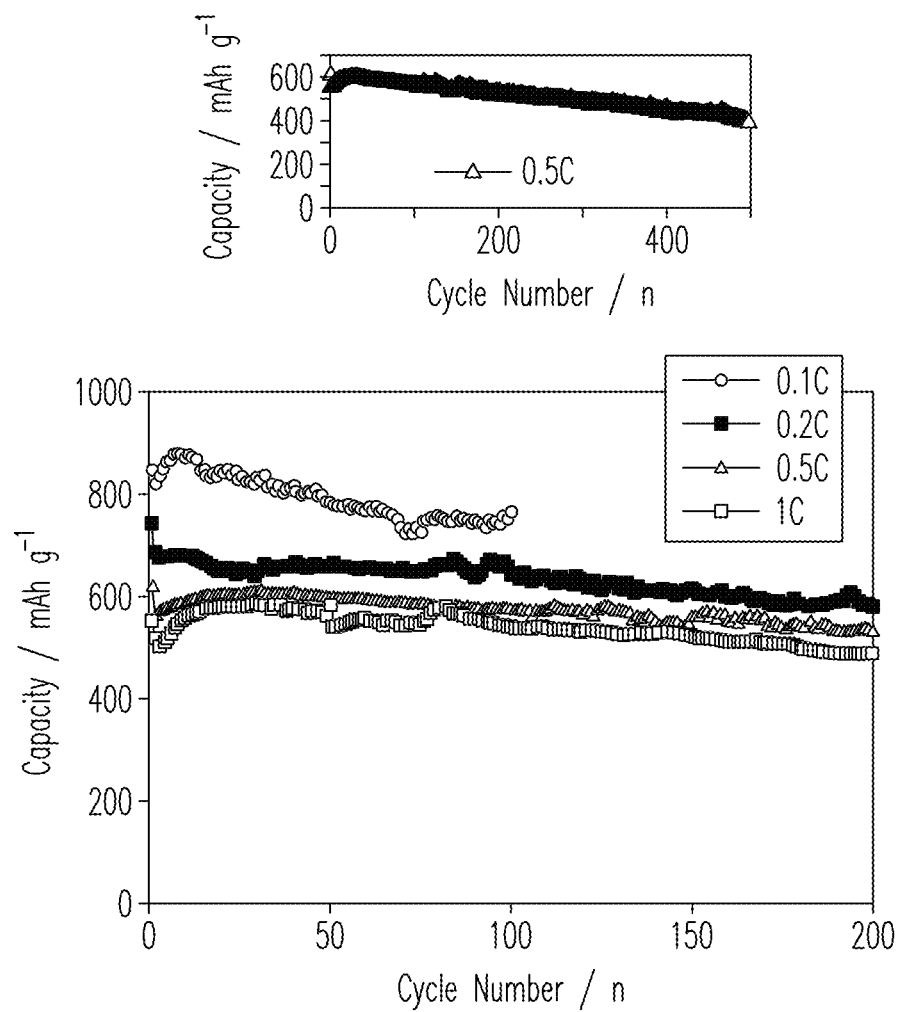

FIGS. 10C and 10D show the rate capabilities of SPANI/S-35 and SPANI/S-55 electrodes, respectively. Both composites experience activation to varying degrees. As the current density increases, the composite electrode with higher sulfur content showed much less capacity fluctuation in the initial cycles. This is because with higher current densities there is not enough time for the interior of the composite to react with $Li^+$ ions, therefore the electrodes are in a more superficial charge/discharge state that slightly sacrificing the reversible capacity. For SPANI/S-35, the capacity retention ratios after 100 cycles at 0.1 C are 97.5%. Even after 200 cycles 78.5, 98 and 97.3% of the original capacity was maintained at 0.2, 0.5 and 1 C, respectively. For SPANI/S-55, a capacity retention ratio of 90.3% was noted after 100 cycles, and this changed to 78.4, 86, 88.5% after 200 cycles at 0.2, 0.5 and 1 C respectively. SPANI/S-55 displayed relatively lower capacity retention rates than those of SPANI/S-35 at different current densities. However, after a very long term cycling (500 cycles) as seen in the insets to FIGS. 10C and 10D, the two composite electrodes retain 66.2 and 68% of their initial capacity at a 0.5 C rate, respectively.

The electrochemical reaction of the sulfur cathode is a complicated process involving a series of electron transfer reactions, coupled with the repeated dissolution/deposition of the sulfur species. The structural reconstruction of the electrode inevitably occurs during cycling. It was found that the thickness of a carbon/sulfur composite electrode changes by about 22% after one discharge/charge cycle. In fact, the capacity fading mechanism of sulfur electrodes, especially at higher sulfur loading, is due to physical cracking of the electrode structure. Thus, the mechanical strength of the conductive supporting matrix becomes particularly important.

The excellent cycling stability and rate performance are firstly related to the SPANI polymer framework formed by the in-situ vulcanization reaction which effectively constrains sulfur and the intermediate lithium polysulfides. As confirmed from the Raman spectra, elemental sulfur already has certain chemical interactions with the polymer backbone during heating process. The incorporation of sulfur in the SPANI matrix is similar as a capsule in which SPANI is tightly coated on the sulfur surface with the aid of chemical interactions formed during vulcanization. Significant differences exist between as-formed S/SPANI and traditional S/carbon composites. In the conventional S/C composites the soluble polysulfides can be considered as "water" in a "broken bucket" in which the hard container (carbon) can only slow down the leaking process if the hole size (pore size of carbon) on the "bucket" is tuned appropriately. In this S/SPANI design, however, the bucket or the container itself becomes elastic during charge/discharge, which is the second critical factor to stabilize polysulfides. During discharge, the sulfur is converted into polysulfide and $Li_2S$ increasing the volume of the active material. Meanwhile a fraction of disulfide bonds connected on the SPANI polymer split into dithiolate form during discharge, thus the polymer matrix then can expand concurrently with the transition from S to $Li_2S$. During the next charge, the volume of $Li_2S$ shrinks when it turns back to sulfur while the disulfide bonds recombine therefore reduces the polymer volume simultaneously. In other words, SPANI functions as a self-breathing framework to accommodate the volume changes of sulfur during electrochemical reactions. SPANI backbones effectively hold the "water" (soluble polysulfides) like an adjustable "soft bucket". Therefore the mechanical stress arising from the electrochemical reaction is more effectively alleviated than using other ceramic materials or carbon matrix composites benefitting the long-term cycling stability of the composite electrode.

This self-accommodation ability of SPANI network also explains well the aforementioned activation process observed in the cycling performance. During each expansion process more new surface areas of SPANI are exposed to sulfur and more soluble polysulfides which are then in turn chemically bonded to the polymer matrix. Those chemically adsorbed active species effectively get involved in the whole electrochemical process gradually increasing the utilization rate of element sulfur in the first tens of cycles until a kinetic equilibrium is built.

Finally the influences from the amine and imine groups on the SPANI main chain cannot be ignored since they are electropositive and grafting the negative polysulfide ions in the vicinity of the polymer framework in a way more akin to chemical bonding than mere physical absorption.

Figure 11A:
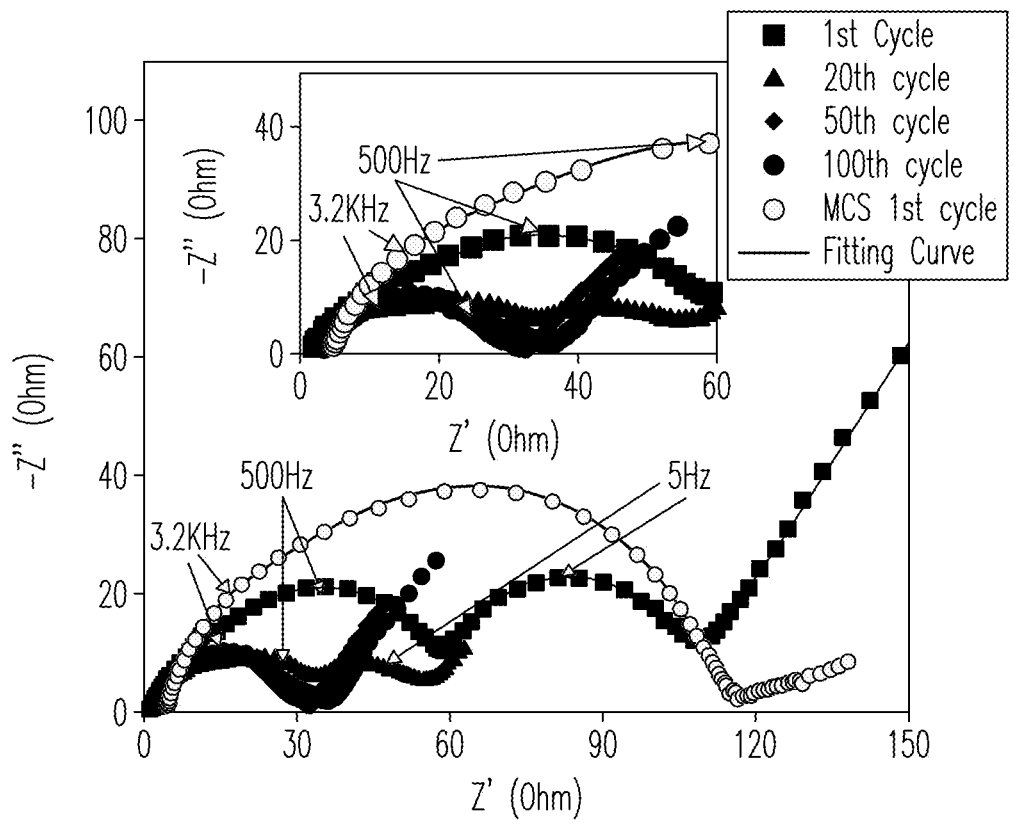
FIGS. 11A and 11B contains electrical impedance spectroscopy data acquired on a SPANI/S-55 sample according to embodiments of the present invention.
Figure 11B:
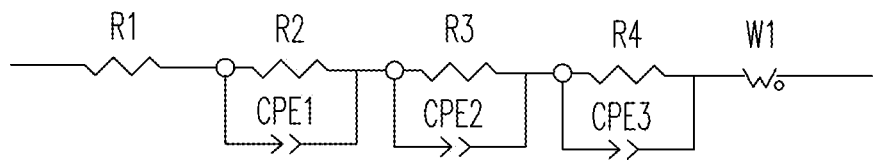

Electrochemical impedance spectroscopy of the SPANI/S-55 composite was carried out on the completely charged state of the material after respective cycles as shown in FIG. 11A. For comparison the EIS pattern of a mesoporous carbon/S (MCS) composite was also plotted in FIG. 11A. Both composites displayed two overlapped flattened semicircles in the high (3.2 KHz) and the medium (520 Hz) frequency range. It is presumed that the semicircles in the high (3.2 Hz) and the medium (520 Hz) frequency range correspond respectively to the surface film resistance between the electrode and electrolyte (R2) and charge transfer resistance of elemental sulfur (R3). In the SPANI/S composite, a third semicircle emerges in the low (5 Hz) frequency range, which should be should be assigned to the charge transfer resistance of SPANI (R4). The impedance parameters can be fitted using the equivalent circuit shown in FIG. 11B. Measured data are shown in Table 3.

TABLE 3

EIS Parameters of SPANI/S-55 electrode during different cycles derived from the equivalent circuit shown in FIG. 8b and mesoporous carbon/S electrode during first cycle derived from the equivalent circuit shown in literature.

|  | Cycle number/n | R1/Ω | R2/Ω | R3/Ω | R4/Ω |
|---|---|---|---|---|---|
| SPANI/S-55 | 1 | 1.64 | 11.2 | 46.0 | 45.0 |
|  | 20 | 2.16 | 13.5 | 16.8 | 21.2 |
|  | 50 | 3.63 | 22.0 | 2.13 | 4.29 |
|  | 100 | 3.67 | 22.6 | 1.45 | 8.79 |
| MCS | 1 | 1.08 | 17.9 | 84.9 |  |

Results indicate that the solution (R1) and surface film resistance grow gradually, probably caused by some insoluble $Li_2S$ accumulated on the electrode surface. The charge transfer resistance of elemental sulfur shows a descending trend, indicating the continuous immersion of the electrolyte increases the reactive contact area. Also the electrode structural evolution during cycling, which enhances the electrochemical reaction kinetics, may also favor a reduction of the charge transfer resistance. However, the impedance corresponding to the SPANI electrochemical reaction first decreases then slightly increases. The initial immersion into the electrolyte can enhance the polymer's electrode reaction kinetics. An increasing number of disulfide bonds participated in the reaction while some of the dissociated disulfide bonds could not recover to the original crosslinked state, thus impeding the SPANI electrochemical reaction in subsequent cycles. This explanation is supported by changes in the capacity of the SPANI electrode which increases in the first 50 cycles and then gradually decays in later cycles (FIGS. 8A and 8B).

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A lithium-sulfur energy storage device having a positive electrode comprising a composite material, the composite material comprising a sulfurized polymer having cross-linked chains through sulfur bonds and further comprising sulfide particles, polysulfide particles, or both, the sulfide particles, polysulfide particles, or both, are not bonded to the sulfurized polymer but are confined in the composite material by the polymer cross-linked chains, the device configured to have a reversible capacity of at least 600 mAhg$^{-1}$ when operated.

2. The lithium-sulfur energy storage device of claim 1, wherein the positive electrode further comprises sulfur particles, the sulfur particles not bonded to the sulfurized polymer but distributed among the chains.

3. The lithium-sulfur energy storage device of claim 1, wherein the polymer comprises sulfurized polyaniline (SPANI).

4. The lithium-sulfur energy storage device of claim 1, further comprising functional groups attached to the polymer chains.

5. The lithium-sulfur energy storage device of claim 4, wherein the functional groups are amine groups, imine groups, or both.

6. The lithium-sulfur energy storage device of claim 1, wherein the composite material is electrically conductive.

7. The lithium-sulfur energy storage device of claim 1, wherein the composite material further comprises nanotubes.

8. The lithium-sulfur energy storage device of claim 1, wherein the positive electrode further comprises a layer comprising a conductive carbon material contacting the composite material.

9. The lithium-sulfur energy storage device of claim 8, wherein the conductive carbon material comprises graphene.

10. The lithium-sulfur energy storage device of claim 1, further comprising a conductive carbon material distributed throughout the composite material.

11. The lithium-sulfur energy storage device of claim 10, wherein the conductive carbon material comprises graphene.

12. The lithium-sulfur energy storage device of claim 1, wherein the positive electrode has a sulfurized polymer-to-sulfide/polysulfide-particles weight ratio between 2.5 and 0.7.

13. The lithium-sulfur energy storage device of claim 1, wherein the sulfurized polymer has a sulfur content between 25 wt% and 60 wt%.

14. The lithium-sulfur energy storage device of claim 1, wherein the sulfide particles, the polysulfide particles, or both are crystalline.

15. A lithium-sulfur energy storage device comprises a negative electrode comprising lithium and a positive electrode comprising a composite material, the composite material comprising sulfurized polyaniline (SPANI) polymer having cross-linked chains through sulfur bonds and having nanoparticles comprising sulfide anions, nanoparticles comprising polysulfide anions, or both, wherein the sulfide anion nanoparticles, the polysulfide anion nanoparticles, or both, are not bonded to the sulfurized polyaniline (SPANI) polymer but are confined among the sulfurized polyaniline (SPANI) polymer chains located between the nanoparticles, the device configured to have a reversible capacity of at least 600 mAh $g^{-1}$ when operated.

* * * * *